US012112564B2

(12) United States Patent
Young (10) Patent No.: US 12,112,564 B2
(45) Date of Patent: *Oct. 8, 2024

(54) CONTEXTUAL ANALYSIS FOR DIGITAL IMAGE PROCESSING

(71) Applicant: Bank of America Corporation, Charlotte, NC (US)

(72) Inventor: Michael R. Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,187

(22) Filed: Oct. 10, 2023

(65) Prior Publication Data

US 2024/0037972 A1   Feb. 1, 2024

Related U.S. Application Data

(63) Continuation of application No. 17/329,957, filed on May 25, 2021, now Pat. No. 11,823,476.

(51) Int. Cl.
*G06N 20/00* (2019.01)
*G06F 40/279* (2020.01)
*G06V 30/413* (2022.01)

(52) U.S. Cl.
CPC .......... *G06V 30/413* (2022.01); *G06F 40/279* (2020.01); *G06N 20/00* (2019.01)

(58) Field of Classification Search
CPC ...... G06V 30/413; G06V 10/82; G06V 20/70; G06F 40/279; G06N 20/00; G06N 3/09

USPC .......................................................... 382/181
See application file for complete search history.

(56) References Cited

U.S. PATENT DOCUMENTS

| | | |
|---|---|---|
| 5,063,603 A | 11/1991 | Burt |
| 5,553,281 A | 9/1996 | Brown et al. |
| 5,781,650 A | 7/1998 | Lobo et al. |
| 5,802,361 A | 9/1998 | Wang et al. |
| 5,845,639 A | 12/1998 | Hochman et al. |
| 5,982,912 A | 11/1999 | Fukui et al. |
| 6,035,055 A | 3/2000 | Wang et al. |
| 6,038,333 A | 3/2000 | Wang |
| 6,173,068 B1 | 1/2001 | Prokoski |
| 6,556,709 B1 | 4/2003 | Kumar |
| 6,556,713 B2 | 4/2003 | Kobayashi et al. |
| 6,616,701 B2 | 9/2003 | Doyle |
| 6,785,421 B1 | 8/2004 | Gindele et al. |
| 6,801,641 B2 | 10/2004 | Eraslan |

(Continued)

*Primary Examiner* — Stephen P Coleman (57) ABSTRACT

A device configured to receive a request for processing a digital document that identifies a target data structure. The device is further configured to obtain the digital document and to process the digital document to identify objects within the digital document. The device is further configured to input the digital document into a machine learning model that is configured to output contextual metadata for the digital document based on the digital document. The contextual metadata describes attributes of the identified objects within the digital document. The device is further configured to populate a first subset of entries in the target data structure with identifiers for the objects identified within the digital document and to populate a second subset of entries in the target data structure with the contextual metadata. The device is further configured to send the populated target data structure to the network device.

20 Claims, 7 Drawing Sheets

(56) References Cited

U.S. PATENT DOCUMENTS

| | | |
|---|---|---|
| 6,819,783 B2 | 11/2004 | Goldberg et al. |
| 6,919,892 B1 | 7/2005 | Cheiky et al. |
| 6,931,419 B1 | 8/2005 | Lindquist |
| 7,006,236 B2 | 2/2006 | Tomasi et al. |
| 7,028,253 B1 | 4/2006 | Lieberman et al. |
| 7,203,356 B2 | 4/2007 | Gokturk et al. |
| 7,310,431 B2 | 12/2007 | Gokturk et al. |
| 7,340,077 B2 | 3/2008 | Gokturk et al. |
| 7,382,903 B2 | 6/2008 | Ray |
| 7,542,610 B2 | 6/2009 | Gokturk et al. |
| 7,576,752 B1 | 8/2009 | Benson et al. |
| 2001/0033690 A1 | 10/2001 | Berche et al. |
| 2002/0055955 A1 | 5/2002 | Lloyd-Jones et al. |
| 2002/0090132 A1 | 7/2002 | Boncyk et al. |
| 2002/0093678 A1 | 7/2002 | Skidgel et al. |
| 2002/0097893 A1 | 7/2002 | Lee et al. |
| 2002/0103813 A1 | 8/2002 | Frigon |
| 2002/0107718 A1 | 8/2002 | Morrill et al. |
| 2002/0114522 A1 | 8/2002 | Seeber |
| 2003/0028451 A1 | 2/2003 | Ananian |
| 2003/0063779 A1 | 4/2003 | Wrigley |
| 2003/0202683 A1 | 10/2003 | Ma et al. |
| 2004/0264810 A1 | 12/2004 | Taugher et al. |
| 2005/0078885 A1 | 4/2005 | Ozaki et al. |
| 2005/0271304 A1 | 12/2005 | Retterath et al. |
| 2006/0133699 A1 | 6/2006 | Widrow et al. |
| 2006/0227992 A1 | 10/2006 | Rathus et al. |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2007/0081744 A1 | 4/2007 | Gokturk et al. |
| 2007/0265834 A1 | 11/2007 | Melnick |
| 2008/0080745 A1 | 4/2008 | Vanhoucke et al. |
| 2008/0082426 A1 | 4/2008 | Gokturk et al. |
| 2008/0212849 A1 | 9/2008 | Gao |
| 2012/0179639 A1* | 7/2012 | Robson ............... G06F 16/907 706/50 |

* cited by examiner

| | 604 | | 606 | 608 | |
|---|---|---|---|---|---|
| | Human | Proximity | Address | Geospatial | |
| | Adult | 12 ft. | 123 Main | 35.4984 1353, -80.8491 | 602 |
| | Child | 8 ft. | 123 Main | 35.4984 1353, -80.8491 | |

| | Structure | Proximity | Address | Geospatial | |
|---|---|---|---|---|---|
| | Two Story Brick | 12 ft. | 123 Main | 35.4984 1353, -80.8491 | 602 |
| | ATM | 8 ft. | 123 Main | 35.4984 1353, -80.8491 | |

CONTEXTUAL ANALYSIS FOR DIGITAL IMAGE PROCESSING

CROSS-REFERENCE TO RELATED APPLICATIONS

This application is a continuation of U.S. patent application Ser. No. 17/329,957 filed May 25, 2021, and entitled "CONTEXTUAL ANALYSIS FOR DIGITAL IMAGE PROCESSING," which is incorporated herein by reference.

TECHNICAL FIELD

The present disclosure relates generally to digital image processing, and more specifically to a contextual analysis for digital image processing.

BACKGROUND

Existing computing systems are typically configured to convert a physical document into a digital version of the document. This process typically involves scanning a physical document (e.g. a paper with text) and then generating a digital representation of the physical document. This conversion process simply provides a digital copy of the physical document. Existing systems lack the ability to extract any information from the physical document through this conversion process. This means that existing computing systems will typically rely on additional processes to extract information from the digital copies of the physical documents. These additional processes require additional hardware resources which reduce the number of hardware resources that are available for other processes and reduce the throughput of the system. In addition, these additional processes have limited capabilities and are typically only able to extract text from a document. This means that existing computing systems are unable to extract any other type of information from the physical document.

SUMMARY

The system disclosed in the present application provides a technical solution to the technical problems discussed above by leveraging machine learning to extract information from a digital document as well as contextual information that is associated with objects within the digital document. The disclosed system provides several practical applications and technical advantages which include a process for extracting multiple levels of information from a digital document. More specifically, this process allows a system to identify both objects that are present within a digital document as well as contextual metadata that is associated with the identified objects. Existing techniques are typically limited to only extracting text from a digital document. In contrast, the disclosed process is able to identify text within a digital document as well as other objects such as graphs, tables, hand-written annotations, people, buildings, signs, devices, or any other suitable type of objects that are present within the digital document. The contextual metadata provides an additional level of information by describing the attributes of the objects within the digital document. Examples of contextual metadata include, but are not limited to, distances between objects, characteristics of people, characteristics of objects, characteristics of physical documents, time of the day, text describing objects, text describing annotations, words spoken in an audio signal, device identifiers, or any other suitable type of information that describes the attributes of an object within a digital document. This process provides a practical application by improving the system's ability to ingest digital documents and extract information from the digital documents. These practical applications not only improve the system's ability to ingest digital documents and extract information from the digital documents but also improve the underlying network and the devices within the network. For example, this disclosed process allows the system to process digital documents without requiring additional hardware resources which increases the number of hardware resources that are available for other processes and increases the throughput of the system.

In one embodiment, the information system comprises a device that is configured to receive a request for processing a digital document from a network device. The device obtains the digital document and processes the digital document to identify objects within the digital document. The device then inputs the digital document into a machine learning model that is configured to output contextual metadata for the digital document based on the digital document. The contextual metadata describes attributes of the identified objects within the digital document. The device then populates a first subset of entries in a target data structure with identifiers for the objects identified within the digital document and populates a second subset of entries in the target data structure with the contextual metadata. The device then sends the populated target data structure to the network device. The populated target data structure comprises information about the objects that are present within a digital document as well as contextual metadata that is associated with the identified objects.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
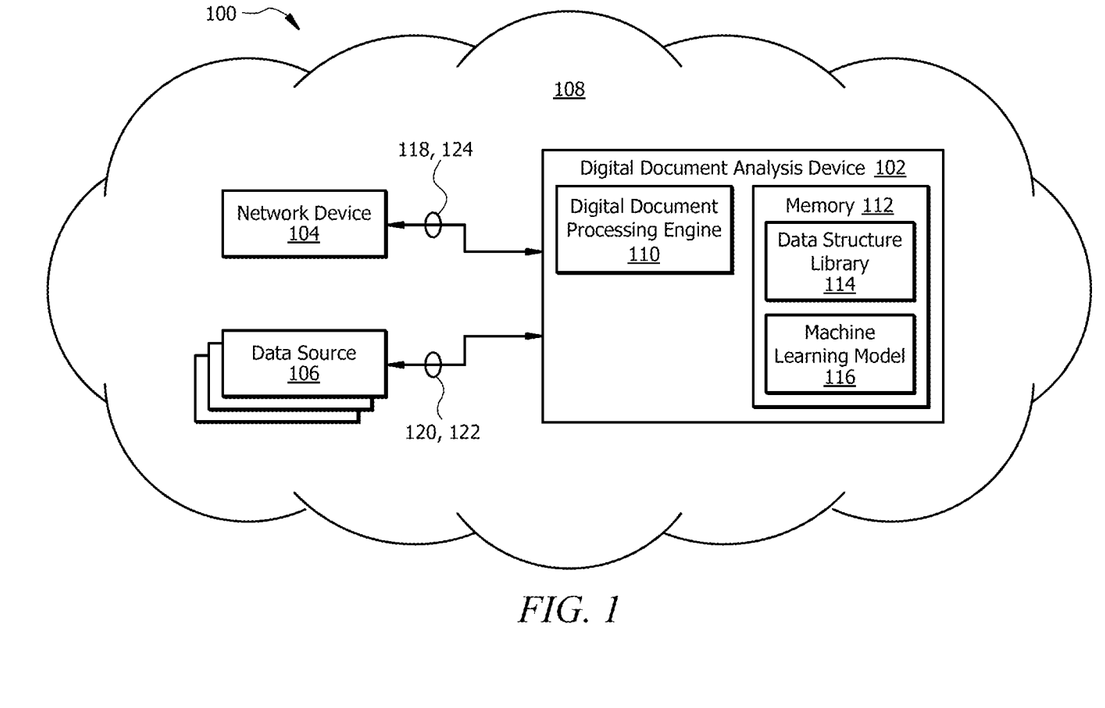
FIG. 1 is a schematic diagram of an embodiment of an information system that is configured to employ a contextual analysis for digital image processing.

FIG. 1 is a schematic diagram of an embodiment of an information system 100 that is configured to employ a contextual analysis process for digital image processing. The information system 100 may employ the contextual analysis process to extract multiple levels of information from a digital document 120. Examples of a digital document 120 include, but are not limited to, a text document, a scanned image of a text document, an image, a spreadsheet, a slide presentation, or any other suitable type of document. The information system 100 employs machine learning to identify objects within the digital document 120 and extract contextual metadata that is associated with the objects within the digital document 120. An object may be any content within the digital document 120 that has uniquely identifiable features. Examples of objects include, but are not limited to, text, numbers, people, buildings, structures, devices, graphs, tables, hand-written annotations, or any other suitable type of object. The contextual metadata describes attributes of the objects that are identified within a digital document 120. Examples of contextual metadata include, but are not limited to, distances between objects, characteristics of people, characteristics of objects, characteristics of physical documents, time of the day, text describing objects, text describing annotations, words spoken in an audio signal, device identifiers, or any other suitable type of information that describes the attributes of an object within a digital document 120. This process allows the information system 100 to increase the amount of data that can be extracted from a digital document 120 by identifying both objects that are present within the digital document 120 as well as any related contextual metadata.

In one embodiment, the information system 100 comprises a digital document analysis device 102, one or more network devices 104, and one or more data sources 106 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

Network Devices

Examples of network devices 104 include, but are not limited to, a smartphone, a tablet, a laptop, a computer, a server, or any other suitable type of network device. A network device 104 may be configured to send a request 118 to the digital document analysis device 102 to request a contextual analysis on a digital document 120. The request 118 may identify a digital document 120 for processing and a target data structure that contains the desired format for providing information associated with the contextual analysis on the digital document 120. In one embodiment, the network device 104 may provide the digital document 120 with the request 118. In other embodiments, the network device 104 may provide information for retrieving or accessing the digital document 120 with the request 118. For example, the network device 104 may provide an identifier (e.g. an alphanumeric identifier) for the digital document 120 and location information (e.g. a data source identifier, a file path, an Internet Protocol (IP) address, or a hyperlink) for where to retrieve the digital document 120. The network device 104 may be configured to send the request 118 to the digital document analysis device 102 using any suitable messaging technique or protocol.

Data Sources

Examples of a data source 106 include, but are not limited to, file repositories, computers, databases, memories, servers, shared folders, or any other suitable type of device. The data source 106 is generally configured to store digital documents 120, sensor data 122, and/or any other suitable type of information that is associated with the information system 100. Sensor data 122 is additional data that is associated with the objects within a digital document 120. Examples of sensor data 122 include, but are not limited to, a video file, an audio file, a list of device identifiers, calendar information, time data, or any other suitable type of information that can be associated with objects within a digital document 120. In one embodiment, the digital document 120 is captured or generated by a first device and the sensor data 122 is captured by a second device that is present when the digital document 120 is being generated or captured. Examples of devices for capturing sensor data 122 include, but are not limited to, Near-Field Communications (NFC) readers, access points, Bluetooth readers, microphones, cameras, scanners, light sensors, a computer, a server, or any other suitable type of device.

Digital Document Analysis Device

Examples of the digital document analysis device 102 include, but are not limited to, a server, a computer, or any other suitable type of network device. In one embodiment, the digital document analysis device 102 comprises a digital document processing engine 110 and a memory 112. Additional details about the hardware configuration of the digital document analysis device 102 are described in FIG. 7. The memory 112 is configured to store a data structure library 114, machine learning models 116, and/or any other suitable type of data.

In one embodiment, the digital document processing engine 110 is generally configured to process a digital document 120 to identify objects within the digital document 120 and to determine contextual metadata that is associated with the identified objects. In one embodiment, the digital document processing engine 110 is configured to employ a variety of digital image processing techniques to identify objects (e.g. text, people, and structures) within a digital document 120. The digital document processing engine 110 is further configured to employ machine learning to determine contextual information that is associated with the objects identified within a digital document 120. The contextual metadata describes attributes of the objects that are identified within a digital document 120. Examples of contextual metadata include, but are not limited to, distances between objects, characteristics of people, characteristics of objects, characteristics of physical documents, time of the day, text describing objects, text describing annotations, words spoken in an audio signal, device identifiers, or any other suitable type of information that describes the attributes of an object within a digital document 120. An example of the digital document processing engine 110 in operation is described in more detail below in FIG. 2.

Examples of machine learning models 116 include, but are not limited to, a multi-layer perceptron, a recurrent neural network (RNN), an RNN long short-term memory (LSTM), or any other suitable type of neural network model. In one embodiment, the machine learning model 116 is generally configured to receive a digital document 120 as an input and to output contextual metadata based on the provided digital document 120. In some embodiments, the machine learning model 116 may also be configured to receive sensor data 122 that is associated with a digital document 120 as an input and to output contextual metadata based on the provided sensor data 122. The machine learning model 116 is trained using supervised learning training data that comprises different types of digital documents 120.

During the training process, the machine learning model 116 determines weights and bias values that allow the machine learning model 116 to map certain types of contextual metadata to different types of objects within a digital document 120. Through this process, the machine learning model 116 is able to identify contextual metadata based on the objects within a digital document 120. The digital document processing engine 110 may be configured to train the machine learning models 116 using any suitable technique as would be appreciated by one of ordinary skill in the art. In some embodiments, the machine learning models 116 may be stored and/or trained by a device that is external from the digital document analysis device 102.

Figure 6:
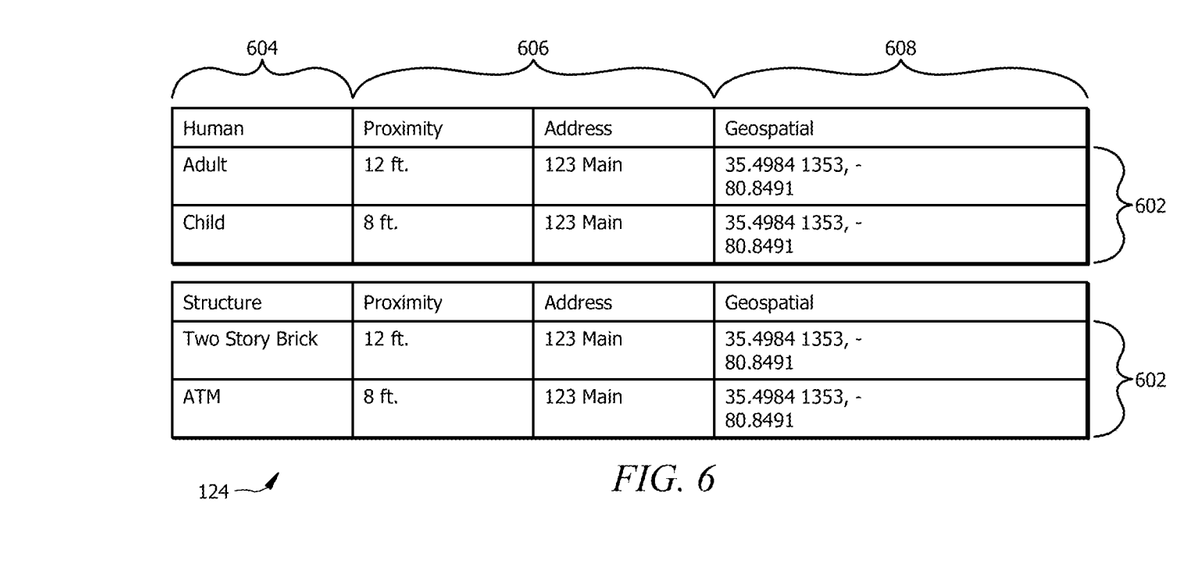
FIG. 6 is an example of a populated data structure after a contextual analysis of a digital document.

The data structure library 114 comprises a plurality of data structures 124. A data structure 124 is configured to identify a format for providing information that is associated with a contextual analysis on a digital document 120. Each data structure 124 comprises a plurality of entries that are each associated with a particular data type. For example, an entry may be associated with objects identified within a digital document 120 or a type of contextual metadata that is associated with objects within a digital document 120. An example of a populated data structure 124 is shown in FIG. 6. The entries in the data structure 124 may be arranged in a user-defined configuration. This feature allows a user to predefine the types of information that would like to receive in the data structure 124 as well as how the information is arranged within the data structure 124. This feature allows the digital document analysis device 102 to provide populated data structures 124 to network devices 104 in a format that streamlines the flow of data traffic within the network 108. This process improves the system's 100 throughput and efficiency when transferring and processing data to downstream network devices 104.

Anomaly Detection Process

Figure 2:
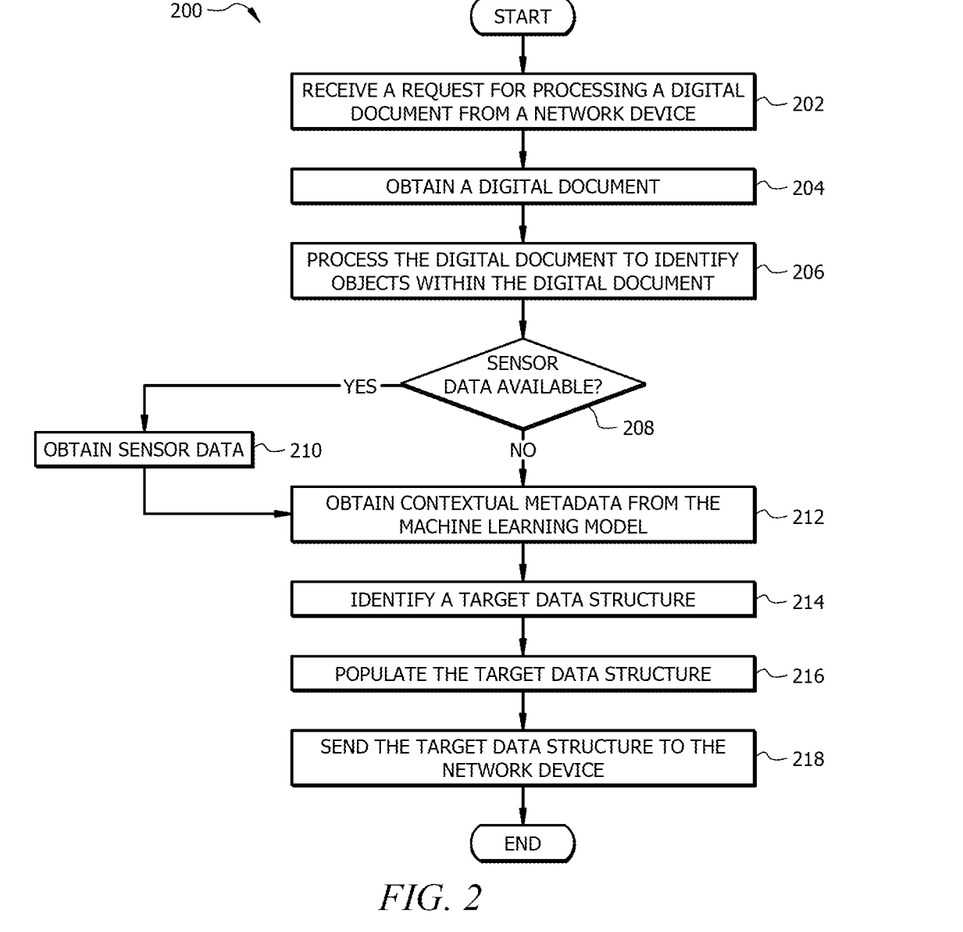
FIG. 2 is a flowchart of an embodiment of a contextual analysis process for the information system.

FIG. 2 is a flowchart of an embodiment of contextual analysis process 200 for the information system 100. The information system 100 may employ process 200 to extract information from a digital document 120. Process 200 employs machine learning to identify objects within a digital document and to extract contextual metadata that is associated with the objects within the digital document 120. The contextual metadata describes attributes of the objects that are identified within a digital document 120. This process allows the information system 100 to increase the amount of data that can be extracted from a digital document 120 by identifying both objects that are present within the digital document 120 as well as any related contextual metadata.

At step 202, the digital document analysis device 102 receives a request 118 for processing a digital document 120 from a network device 104. In one embodiment, the request 118 identifies the digital document 120 and a target data structure to use for providing information associated with the contextual analysis on the digital document 120.

Figure 3:
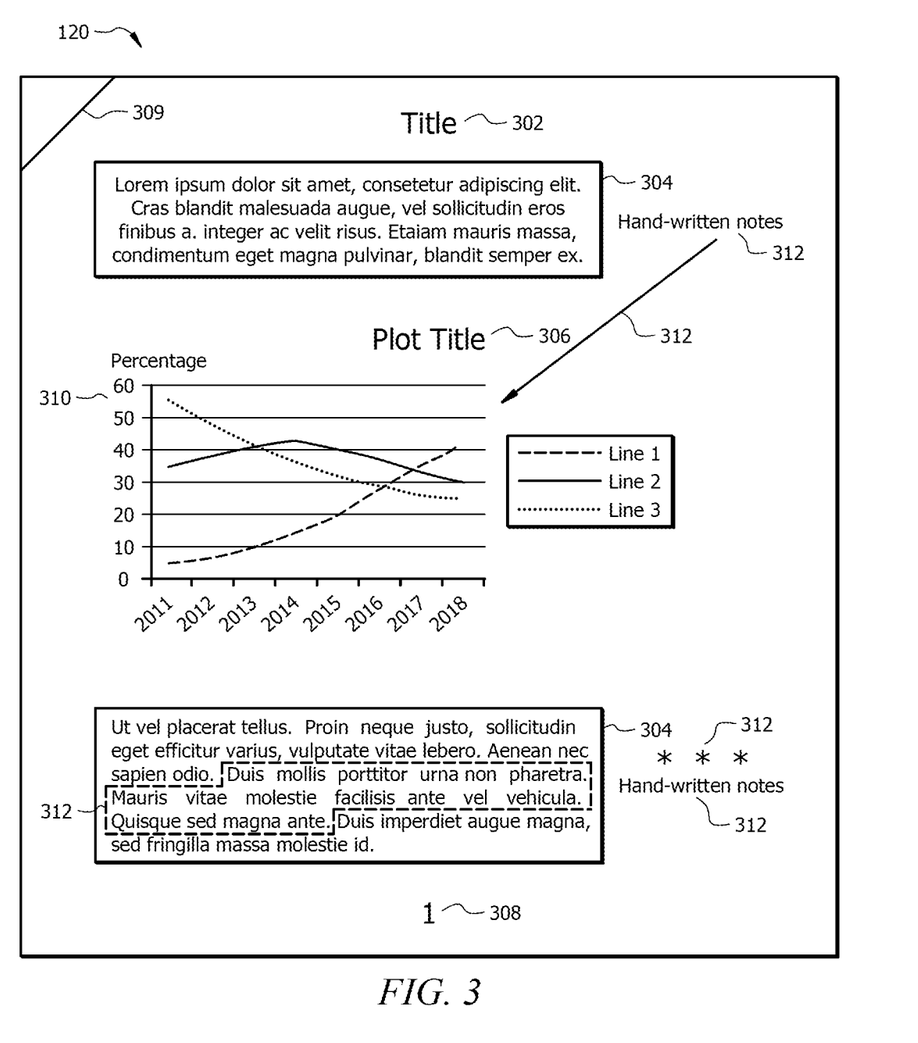
FIG. 3 is an example of a text-based digital document.
Figure 4:
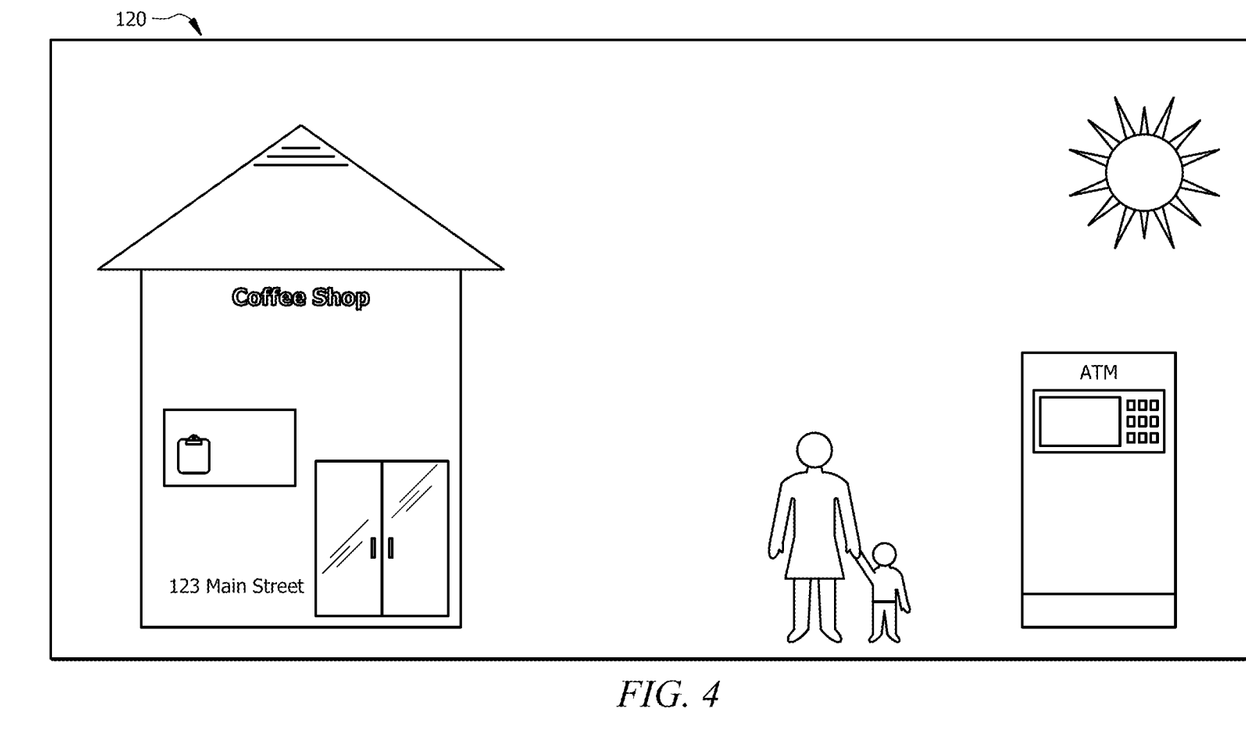
FIG. 4 is an example of an image-based digital document.

At step 204, the digital document analysis device 102 obtains the digital document 120 that is associated with the request 118. In one example, the network device 104 may provide the digital document 120 with the request 118. In this case, the digital document analysis device 102 obtains the digital document 120 directly from the request 118. In another example, the network device 104 may provide information for retrieving or accessing the digital document 120 with the request 118. For instance, the network device 104 may provide an identifier (e.g. an alphanumeric identifier) for the digital document 120 and location information (e.g. a data source identifier, a file path, an IP address, or a hyperlink) for where to retrieve the digital document 120. In this case, the digital document analysis device 102 may use the identifier for the digital document 120 and the location information to retrieve the digital document 120. For example, the digital document analysis device 102 may use the location information to access a location where the digital document 120 is being stored and then may download a copy of the digital document 120 for processing. FIGS. 3 and 4 show examples of text-based digital document 120 and an image-based digital document 120, respectively.

At step 206, the digital document analysis device 102 processes the digital document 120 to identify objects within the digital document 120. The digital document analysis device 102 may employ one or more image processing techniques to identify objects within the digital document 120. For example, the digital document analysis device 102 may employ optical character recognition (OCR), text recognition, object recognition, or any other suitable type of image processing technique.

Referring to FIG. 3 as an example, the digital document 120 may be a scanned copy of a physical document. As another example, the digital document 120 may be a digital word document. In this example, the digital document analysis device 102 may apply OCR techniques to identify objects such as a title 302, text 304, headers 306, page numbers 308, and any other objects within the digital document 120.

Referring to FIG. 4 as another example, the digital document 120 may be an image from a camera or an image from a video recording. In this example, the digital document analysis device 102 may apply object detection techniques to identify objects such as an adult 502, a child 504, a building or structure 506, a sign 508, a device 510, or any other objects within the digital document 120.

Returning to FIG. 2 at step 208, the digital document analysis device 102 determines whether sensor data 122 is available for the digital document 120. In one embodiment, the request 118 may indicate that sensor data 122 is available for the digital document 120. For example, the request 118 may comprise a field that indicates whether sensor data 122 is available and location information (e.g. a data source identifier) for where the sensor data 122 is being stored. In other embodiments, the digital document analysis device 102 may query the data sources 106 to see if any sensor data 122 is available for the digital document 120. For example, the digital document analysis device 102 may send a query that comprises an identifier for the digital document 120 to one or more data sources 106. In response to sending the query, the digital document analysis device 102 receives a response from the data sources 106 that indicates whether any sensor data 122 is available for the digital document 120. The digital document analysis device 102 proceeds to step 210 in response to determining that sensor data is available for the digital document. In this case, the digital document analysis device 102 will obtain any sensor data 122 that is associated with the digital document 120.

At step 210, the digital document analysis device 102 obtains the sensor data 122 for the digital document 120. In one embodiment, the digital document analysis device 102 may send a request to a data source 106 for sensor data 122 that is associated with the digital document 120. For example, the digital document analysis device 102 may send a request that includes an identifier for the digital document 120. In response to sending the request, the digital document analysis device 102 receives any related sensor data 122 from the data source 106. The digital document analysis device 102 may repeat this process with any number of data sources 106 to obtain sensor data 122 that is associated with the digital document 120.

Returning to step 208, the digital document analysis device 102 proceeds to step 212 in response to determining that sensor data is not available for the digital document. In this case, the digital document analysis device 102 will process the digital document 120 using the machine learning model 116 without any additional sensor data 122.

Figure 5:
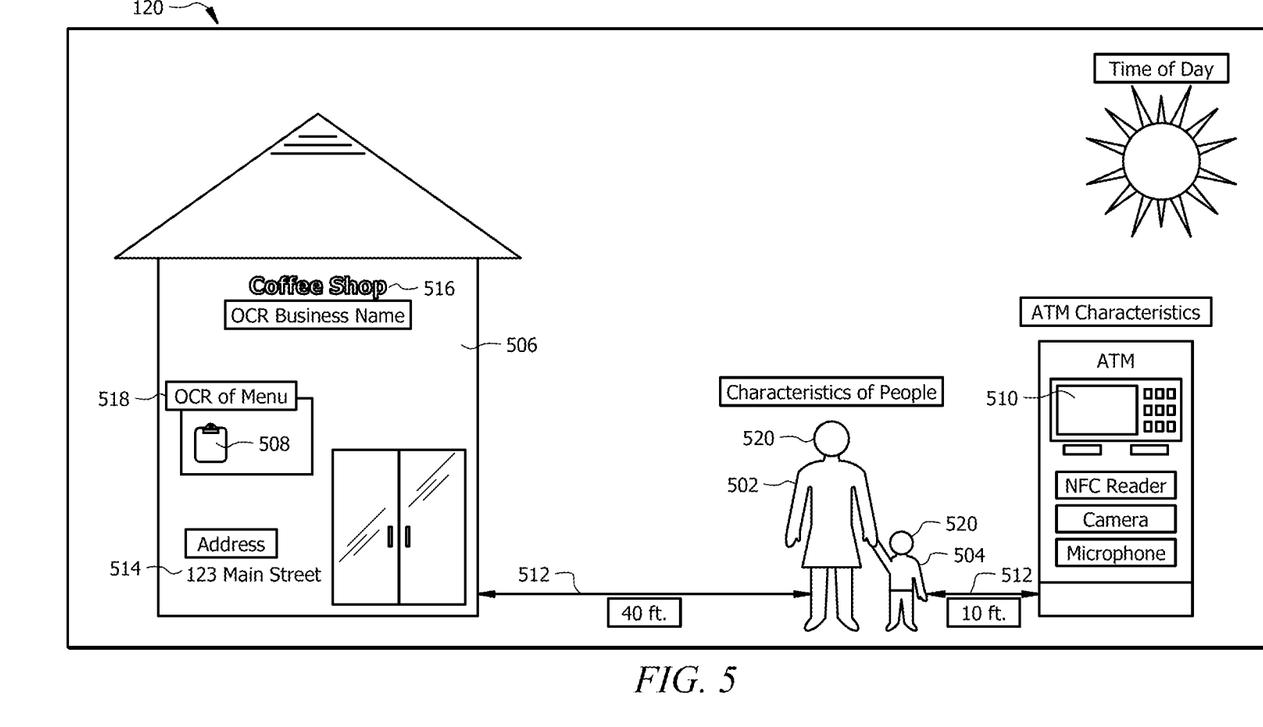
FIG. 5 is an example of the image-based digital document with labeled contextual metadata.

At step 212, the digital document analysis device 102 obtains contextual metadata from the machine learning model 116. Here, the digital document analysis device 102 inputs the digital document 120 into the machine learning model 116. In response to inputting the digital document 120 in the machine learning model 116, the digital document analysis device 102 receives contextual metadata for the digital document from the machine learning model 116. The contextual metadata describes attributes for the objects identified within the digital document 120. Referring to the example in FIG. 5, the machine learning model 116 may output contextual metadata that identifies distances 512 between objects in the digital document 120, an address 514 for a physical location, an identifier 516 for buildings and structures 506, text 518 associated with signs 508, characteristics 520 (e.g. facial expressions or physical descriptions) of people within the digital document 120, actions being performed by people within the digital document 120, or any other information about the attributes for objects within the digital document 120.

Referring back to FIG. 3 as another example, the machine learning model 116 may output contextual metadata that identifies characteristics of a physical document. For example, the machine learning model 116 may identify creases or wrinkles in a physical document, folded corners of a physical document, discoloration of a physical document, the texture of a physical document, tears or missing parts of a physical documents, or any other suitable type of characteristics of a physical document. The machine learning model 116 may be configured to associate one or more characteristics of the physical document to a relevance or importance level. For example, a physical document with creases 309 and/or a worn texture may indicate that a physical document is important. In other examples, the machine learning model 116 may be configured to use any other suitable type or combination of characteristics of a physical document to classify the physical document.

As another example, the machine learning model 116 may identify graphical representations 310 of data within the digital document 120 and output text describing graphical representations 310 of data. Examples of graphical representations 310 of data include, but are not limited to, graphs, charts, tables, images, diagrams, or any other suitable type of graphical representations. In this case, the machine learning model 116 may read or interpret the graphical representation 310 of data and output text the describes the graphical representation 310. For instance, the machine learning model 116 may identify trends within a graph and output text that describes the identified trends. In other examples, the machine learning model 116 may be configured to identify any other suitable type of features or combinations of features from a graphical representation 310 of data.

As another example, the machine learning model 116 may identify text 304 and hand-written annotations 312 within the digital document 120 and output information associated with the text 304 and/or hand-written annotations 312. Examples of hand-written annotations 312 include, but are not limited to, hand-written notes, drawn symbols, drawn arrows, highlights, or any other suitable type of hand-written annotations. In this case, the machine learning model 116 may identify any text 304 that is associated with hand-written annotations 312 and output information that identifies the text 304. For instance, the machine learning model 116 may identify hand-written notes, highlighting, or symbols (e.g. arrows or marks) within the digital document 120. The machine learning model 116 may then identify any text 304 that is associated with the identified hand-written annotations 312. The machine learning model 116 may then output the text 304 that is associated with the hand-written annotations 312.

When contextual metadata for sensor data 122 is available, the digital document analysis device 102 inputs the sensor data 122 into the machine learning model 116. In response to inputting the sensor data 122 in the machine learning model 116, the digital document analysis device 102 receives contextual metadata for the sensor data 122 from the machine learning model 116. Referring to the example in FIG. 5, the machine learning model 116 may receive sensor data 122 from a device with a clock or calendar. In this example, the machine learning model 116 may output a time or date that is associated with the digital document 120. In some embodiments, the machine learning model 116 may alternatively apply one or more image processing techniques to identify features within the digital document 120 that are associated with the day or date of the scene within the digital document 120. For example, the machine learning model 116 may identify the presence and/or location of the sun or moon to determine a time of day. As another example, the machine learning model 116 may identify a timestamp within the digital document 120 that indicates the time or date when the digital document 120 was captured. The machine learning model 116 may then output contextual metadata that identifies the time of day or date that is associated with the scene within the digital document 120.

As another example, the machine learning model 116 may receive sensor data 122 from a device that is configured to communicate with user devices. Examples of these devices include, but are not limited to, an NFC reader, a Bluetooth device, an access point, a computer, a server, or any other suitable type of device. The sensor data 122 may comprise device identifiers for any nearby devices that are detected. In this example, the machine learning model 116 may output contextual metadata that identifies the device identifiers and/or a list of user devices that are associated with the device identifiers.

As another example, the machine learning model 116 may receive sensor data 122 from a microphone or recording device. The sensor data 122 may comprise an audio signal of voices and noise that were present when the digital document 120 was captured. In this example, the machine learning model 116 may output contextual metadata that identifies words or phrases spoken within an audio signal.

Returning to FIG. 2 at step 214, the digital document analysis device 102 identifies a target data structure 124. The digital document analysis device 102 uses the information from the request 118 to identify a target data structure 124 from the data structure library 114. For example, the request 118 may comprise an identifier for the target data structure 124. The digital document analysis device 102 may use the identifier as a search token to identify the target data structure 124 from among the data structures 124 in the data structure library 114.

At step 216, the digital document analysis device 102 populates the target data structure 124. In one embodiment, the digital document analysis device 102 may first identify a subset of entries in the target data structure 124 that is associated with a data type for objects. The digital document analysis device 102 then populates the identified entries with identifiers or labels for the objects that were identified within the digital document 120. The digital document analysis device 102 may then identify another subset of entries in the target data structure 124 that is associated with a data type for contextual metadata. The digital document analysis device 102 then populates the identified entries with the contextual metadata information that was provided by the machine learning model 116. When contextual metadata for sensor data 122 is available, the digital document analysis device 102 may also identify a subset of entries that is associated with a data type for the contextual metadata and then populate the identified entries with the contextual metadata.

Referring to FIG. 6 as an example, the data structure 124 comprises a plurality of entries 602. In this example, the data structure 124 comprises a first subset of entries 604 that is associated with a data type for objects within a digital document 120, a second subset of entries 606 that is associated with contextual metadata for the objects within the digital document 120, and a third subset of entries 608 that is associated with contextual information for sensor data 122. In this example, the entries 604 are populated to identify the objects that were detected within the digital document 120. The entries 606 are populated to identify a distance between objects within the digital document 120 and a physical address that was determined based on object features (e.g. text) within the digital document 120. The entries 608 are populated to identify geospatial information (e.g. Global Positioning System (GPS) coordinates). In other examples, the data structure 124 may comprise entries 602 that are associated with any other suitable type of data type and information.

At step 218, the digital document analysis device 102 sends the populated target data structure 124 to the network device 104. The digital document analysis device 102 may send the populated target data structure 124 to the network device 104 using any suitable messaging technique or protocol. The populated target data structure 124 comprises information about the objects that are present within the digital document 120 as well as contextual metadata that is associated with the identified objects. The network device 104 may then use the populated target data structure 124 for any additional downstream data processing.

Hardware Configuration for the Digital Document Analysis Device

Figure 7:
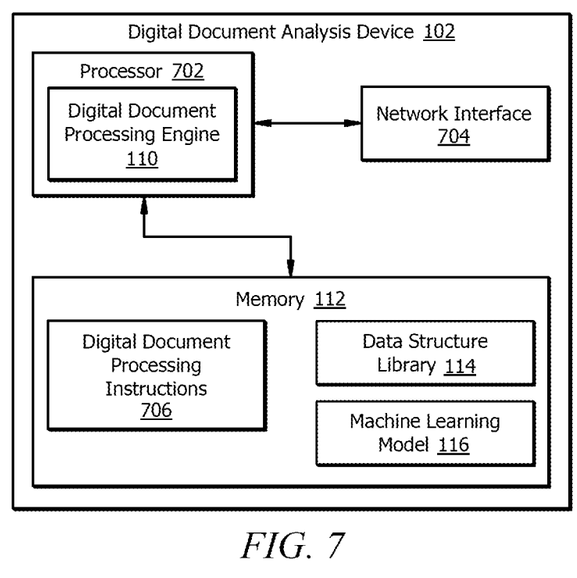
FIG. 7 is an embodiment of a digital document analysis device configured to employ the contextual analysis process for the information system.

FIG. 7 is an embodiment of the digital document analysis device 102 of an information system 100. As an example, the digital document analysis device 102 comprises a processor 702, a memory 112, and a network interface 704. The digital document analysis device 102 may be configured as shown or in any other suitable configuration.

Processor

The processor 702 comprises one or more processors operably coupled to the memory 112. The processor 702 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the memory 112 and the network interface 704. The one or more processors are configured to process data and may be implemented in hardware or software. For example, the processor 702 may be 8-bit, 16-bit, 32-bit, 64-bit, or of any other suitable architecture. The processor 702 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute digital document processing instructions 706 to implement the digital document processing engine 110. In this way, processor 702 may be a special-purpose computer designed to implement the functions disclosed herein. In an embodiment, the digital document processing engine 110 is implemented using logic units, FPGAs, ASICs, DSPs, or any other suitable hardware. The digital document processing engine 110 is configured to operate as described in FIGS. 1-6. For example, the digital document processing engine 110 may be configured to perform the steps of process 200 as described in FIG. 2.

Memory

The memory 112 is operable to store any of the information described above with respect to FIGS. 1-6 along with any other data, instructions, logic, rules, or code operable to implement the function(s) described herein when executed by the processor 702. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store digital document processing instructions 706, a data structure library 114, machine learning models 116, and/or any other data or instructions. The digital document processing instructions 706 may comprise any suitable set of instructions, logic, rules, or code operable to execute the digital document processing engine 110. The data structure library 114 and the machine learning models 116 are configured similar to the data structure library 114 and the machine learning models 116 described in FIGS. 1-6, respectively.

Network Interface

The network interface 704 is configured to enable wired and/or wireless communications. The network interface 704 is configured to communicate data between network devices 104, data sources 106, and other devices, systems, or domains. For example, the network interface 704 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 702 is configured to send and receive data using the network interface 704. The network interface 704 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A digital document analysis device, comprising:
a memory operable to store a plurality of data structures, wherein:
 each data structure comprises a plurality of entries;
 each entry is associated with a particular data type; and
a processor operably coupled to the network interface and the memory, and configured to:
 receive a request for processing a digital document;
 obtain the digital document;
 process the digital document to identify objects within the digital document;
 input the digital document into a machine learning model, wherein the machine learning model is configured to:
  receive the digital document; and
  output contextual metadata for the digital document based on the digital document, wherein the contextual metadata for the digital document describes attributes of the identified objects within the digital document;
 identify a first subset of entries in a target data structure that are associated with a data type for the objects;
 populate the first subset of entries in the target data structure with identifiers for the objects identified within the digital document;
 identify a second subset of entries in the target data structure that are associated with a data type for contextual metadata;
 populate the second subset of entries in the target data structure with the contextual metadata; and
 send the populated target data structure to a network device.

2. The device of claim 1, wherein:
the digital document is an image of a scene; and
the contextual metadata for the digital document identifies a distance between objects within the image.

3. The device of claim 1, wherein:
the digital document is an image of a scene; and
the contextual metadata for the digital document identifies characteristics of people within the image.

4. The device of claim 1, wherein:
the digital document is an image of a scene; and
the contextual metadata for the digital document identifies a time of the day within the image.

5. The device of claim 1, wherein:
the digital document comprises text on a physical document; and
the contextual metadata for the digital document identifies characteristics of the physical document.

6. The device of claim 1, wherein:
the digital document comprises a graphical representation of data; and
the contextual metadata for the digital document comprises a text describing the graphical representation of the data.

7. The device of claim 1, wherein:
the digital document comprises text and hand-written annotations; and
the contextual metadata for the digital document identifies text associated with the hand-written annotations.

8. The device of claim 1, wherein:
the digital document is generated by a first device; and
the processor is further configured to:
 obtain sensor data that is associated with the digital document, wherein the sensor data is captured by a second device that is present when the digital document is generated;
 input the sensor data into the machine learning model;
 receive contextual metadata for the sensor data from the machine learning model;
 identify a third subset of entries in the target data structure that are associated with a data type for contextual metadata for the sensor data; and
 populate the third subset of entries in the target data structure with the contextual metadata for the sensor data.

9. The device of claim 8, wherein:
the sensor data comprises an audio signal; and
the contextual metadata for the sensor data identifies words spoken in the audio signal.

10. The device of claim 8, wherein:
the sensor data comprises a plurality of device identifiers; and
the contextual metadata for the sensors identifies user devices associated with the device identifiers.

11. A digital document analysis method, comprising:
receiving a request for processing a digital document, wherein:
 the request is associated with a target data structure; and
 the target data structure comprises a plurality of entries that are each associated with a data type;
obtaining the digital document;
processing the digital document to identify objects within the digital document;
inputting the digital document into a machine learning model, wherein the machine learning model is configured to:
 receive the digital document; and
 output contextual metadata for the digital document based on the digital document, wherein the contextual metadata for the digital document describes attributes of the identified objects within the digital document;
identifying a first subset of entries in the target data structure that are associated with a data type for objects;

populating the first subset of entries in the target data structure with identifiers for the objects identified within the digital document;

identifying a second subset of entries in the target data structure that are associated with a data type for contextual metadata;

populating the second subset of entries in the target data structure with the contextual metadata; and sending the populated target data structure to a network device.

12. The method of claim 11, wherein:
the digital document is an image of scene; and
the contextual metadata for the digital document identifies a distance between objects within the image.

13. The method of claim 11, wherein:
the digital document is an image of a scene; and
the contextual metadata for the digital document identifies characteristics of people within the image.

14. The method of claim 11, wherein:
the digital document comprises text on a physical document; and
the contextual metadata for the digital document identifies characteristics of the physical document.

15. The method of claim 11, wherein:
the digital document comprises text and hand-written annotations; and
the contextual metadata for the digital document identifies text associated with the hand-written annotations.

16. The method of claim 11, wherein the digital document is generated by a first device; and
further comprising:
obtaining sensor data that is associated with the digital document, wherein the sensor data is captured by a second device that is present when the digital document is generated;
inputting the sensor data into the machine learning model;
receiving contextual metadata for the sensor data from the machine learning model;
identifying a third subset of entries in the target data structure that are associated with a data type for contextual metadata for the sensor data; and
populating the third subset of entries in the target data structure with the contextual metadata for the sensor data.

17. A non-transitory computer-readable medium storing instructions that when executed by a processor cause the processor to:
receive a request for processing a digital document, wherein:
the request is associated with a target data structure;
the target data structure comprises a plurality of entries that are each associated with a data type;
obtain the digital document;
process the digital document to identify objects within the digital document;
input the digital document into a machine learning model, wherein the machine learning model is configured to:
receive the digital document; and
output contextual metadata for the digital document based on the digital document, wherein the contextual metadata for the digital document describes attributes of the identified objects within the digital document;
identify a first subset of entries in the target data structure that are associated with a data type for objects;
populate the first subset of entries in the target data structure with identifiers for the objects identified within the digital document;
identify a second subset of entries in the target data structure that are associated with a data type for contextual metadata;
populate the second subset of entries in the target data structure with the contextual metadata; and
send the populated target data structure to a network device.

18. The non-transitory computer-readable medium of claim 17, wherein the digital document is generated by a first device; and
the instructions further cause the processor to:
obtain sensor data that is associated with the digital document, wherein the sensor data is captured by a second device that is present when the digital document is generated;
input the sensor data into the machine learning model;
receive contextual metadata for the sensor data from the machine learning model;
identify a third subset of entries in the target data structure that are associated with a data type for contextual metadata for the sensor data; and
populate the third subset of entries in the target data structure with the contextual metadata for the sensor data.

19. The non-transitory computer-readable medium of claim 17, wherein:
the digital document comprises text on a physical document; and
the contextual metadata for the digital document identifies characteristics of the physical document.

20. The non-transitory computer-readable medium of claim 17, wherein:
the digital document comprises text and hand-written annotations; and
the contextual metadata for the digital document identifies text associated with the hand-written annotations.

* * * * *